(12) United States Patent
Farag (10) Patent No.: US 11,540,131 B2
(45) Date of Patent: Dec. 27, 2022

(54) CUSTOMER CONTROL OF THEIR MOBILE ASSETS

(71) Applicant: T-MOBILE USA, INC., Bellevue, WA (US)

(72) Inventor: Paul Farag, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 309 days.

(21) Appl. No.: 16/867,752

(22) Filed: May 6, 2020

(65) Prior Publication Data
US 2021/0352480 A1   Nov. 11, 2021

(51) Int. Cl.
| | |
|---|---|
| *H04W 12/08* | (2021.01) |
| *H04L 29/06* | (2006.01) |
| *H04L 29/12* | (2006.01) |
| *H04L 12/46* | (2006.01) |
| *H04W 88/16* | (2009.01) |

(Continued)

(52) U.S. Cl.
CPC ....... *H04W 12/086* (2021.01); *H04L 12/4633* (2013.01); *H04L 61/5014* (2022.05); *H04L 63/0272* (2013.01); *H04L 63/08* (2013.01); *H04L 63/20* (2013.01); *H04W 12/088* (2021.01); *H04W 88/16* (2013.01)

(58) Field of Classification Search
CPC . H04L 12/4633; H04L 61/2015; H04L 63/20; H04L 63/08; H04L 63/0272; H04W 88/16; H04W 12/086; H04W 12/088
See application file for complete search history.

(56) References Cited

U.S. PATENT DOCUMENTS 9,848,378 B2 * 12/2017 Anpat .................. H04W 36/22
10,432,561 B2 * 10/2019 Albouyeh ............... H04L 51/12

(Continued)

FOREIGN PATENT DOCUMENTS

WO   WO-2012/075448 A1   6/2012

OTHER PUBLICATIONS

Wood et al., The case for enterprise-ready virtual private clouds, USENIX, the Advanced Computing Systems Association, HotCloud'09: Proceedings of the 2009 Conference on Hot Topics in Cloud Computing, 5 pp. (May 29, 2009).

(Continued)

*Primary Examiner* — Abdullahi E Salad
(74) *Attorney, Agent, or Firm* — Marshall, Gerstein & Borun LLP (57) ABSTRACT

Systems, methods, and devices for secure and configurable control of user equipment (UE) devices associated with enterprise accounts are disclosed herein. Each enterprise account is associated with a plurality of UE devices, which may access networked assets associated with the enterprise. In order to manage UE device access to enterprise assets and to other networks via an internet connection through a wireless telecommunications network, data associated with different enterprise accounts is virtually separated at the edge routers and maintained as separate data streams to distinct virtual environments associated with the enterprise accounts at one or more asset hosting servers. The virtual environments on the assets hosting servers further facilitate enterprise-specific control of mobile assets, such as enforcing security policies relating to access, connections, filtering, or encryption.

18 Claims, 4 Drawing Sheets

(51) Int. Cl.
*H04W 12/086* (2021.01)
*H04W 12/088* (2021.01)
*H04L 9/40* (2022.01)
*H04L 61/5014* (2022.01)

(56) References Cited

U.S. PATENT DOCUMENTS

| | | | |
|---|---|---|---|
| 2010/0205304 A1* | 8/2010 | Chaturvedi | H04L 61/2015 709/226 |
| 2010/0235829 A1* | 9/2010 | Shukla | H04L 67/34 717/177 |
| 2013/0232463 A1* | 9/2013 | Nagaraja | G06F 3/0482 717/101 |
| 2017/0075662 A1* | 3/2017 | Eksten | G06F 9/44521 |
| 2017/0288906 A1* | 10/2017 | Paredes | H04L 12/4641 |
| 2018/0115487 A1* | 4/2018 | Thubert | H04L 65/60 |

OTHER PUBLICATIONS

European Patent Application No. 20191183.1 Extended European Search Report, dated Nov. 17, 2020.

* cited by examiner

CUSTOMER CONTROL OF THEIR MOBILE ASSETS

FIELD OF THE DISCLOSURE

The present disclosure relates to securing network traffic and assets in core network equipment of telecommunications networks for enterprise account customers associated with a plurality of User Equipment (UE) devices.

BACKGROUND

Wireless network carriers often serve multiple enterprise customers. Enterprise account customers encompass businesses, educational institutions, and government entities. Typically, enterprise customers have many User Equipment (UE) devices which may include mobile phones, smart phones, and tablet devices. UE devices may also include an increasing number of smart cars or internet-enabled appliances. These enterprise UEs are a subset of the UEs that operate on the wireless network carrier. Oftentimes, larger enterprise customers additionally have enterprise routers to assist in management of the data available to their UEs. Wireless network carriers currently offer dedicated private Access Point Names (APNs) to many of their larger enterprise customers. An APN has the network settings necessary for the enterprises UEs to connect to a secure gateway or to the internet or to a private network such as a virtual private network (VPN), which is configured to be used by only the UEs associated with the corresponding enterprise customer account. For example, the enterprise may require that all its UEs use only the cellular carrier's network and disallow cellular roaming. In addition, the enterprises may desire, for security reasons, that all the UEs for that particular enterprise disallow Wi-Fi access on an open public network. Alternately, the enterprise may prefer to save data charges by having the UEs use (or selectively use) certain Wi-Fi networks. In addition to those functions, however, UEs need to be monitored, provisioned, updated, load balanced, filtered, billed at various rates, and managed by security services or restricted in various ways depending on the enterprise.

Unfortunately, the APN method that wireless network carriers currently offer enterprise customers does not support such added services as sophisticated monitoring, subscriber provisioning, internet filtering, billing, security or load balancing which a growing number of enterprise customers requests from the service providers. Many enterprises desire specific routing, billing, security rules, access restrictions, provisioning and load balancing to be applied to the enterprise's UE mobile devices. These enterprise rules are often distinct from those other enterprises apply to their UE mobile devices, which share the same wireless network provider. The wireless network provider, then, has a need to provide multiple environments for their differing enterprise customers in order to support differing rules and services for their multiple enterprises over shared mobile network infrastructure equipment.

SUMMARY

The innovation described herein enables wireless network providers to offer secure and separate control of their associated mobile assets, without the need for duplication of network infrastructure. This secure and separate control includes security policies, traffic monitoring, load balancing, billing, third-party access restrictions, restrictions to internet access and other services to the UEs associated with each enterprise account. With this innovation, wireless network providers can offer this level of control to enterprise customers, while maintaining separation between the data of multiple enterprise customers using the same core network hardware.

The present application discloses systems, devices, methods, and computer-readable media storing instructions for control of mobile assets associated with enterprise accounts. As described further below, systems and devices for controlling such mobile assets may include: one or more edge routers configured to provide access to a communication network to a plurality of user equipment (UE) devices; one or more packet data gateways communicatively connected to one or more edge routers; and/or one or more asset-hosting servers communicatively connected to the one or more packet data gateways and configured to implement a plurality of virtual environments. Such components may be configured such that the one or more edge routers separate communication data associated with a plurality of UE devices into a plurality of data streams, each data stream being associated with one or more of the plurality of UE devices and with one or more of the plurality of virtual environments, such that each virtual environment is associated with a separate enterprise customer account. In some embodiments, the one or more packet data gateways may be configured with a plurality of access point names (APNs), wherein each of the APNs is assigned to an enterprise customer account associated with a subset of the plurality of UE devices, such that communication data associated with each of the APNs is separated from communication data associated with other APNs.

The asset-hosting servers may be configured to perform virtual routing and forwarding to separate communication data. Likewise, the asset-hosting servers may be configured to provide Dynamic Host Configuration Protocol (DHCP) services to assign internet protocol (IP) addresses for one or more of the virtual environments. In some embodiments, the asset-hosting servers may be configured to provide content filtering for one or more of the virtual environments. Similarly, the asset-hosting servers may be configured to regulate UE access to application stores or to third-party application downloads. The asset-hosting servers may be configured to provide security services for one or more of the virtual environments, the security services including managing one or more of: password policies, data wiping, data encryption, UE use of removable media, UE connectivity to peripheral devices, or UE use of an associated camera. In further embodiments, the asset-hosting servers may be part of a cloud storage network, such as a third-party cloud services network. In yet further embodiments, the asset-hosting servers may be configured to perform initial provisioning of UE devices corresponding to one of the virtual environments, or the asset-hosting servers may be configured to perform updates of applications or configuration of UE devices corresponding to one of the virtual environments.

Similarly, methods and stored instructions for controlling such mobile assets may include: receiving, at an edge router, a plurality of requests to access enterprise assets associated with a plurality of enterprise customers from a plurality of user equipment (UE) devices; separating, by the edge router, the plurality of requests into a plurality of data streams, each data stream maintained separately and associated with a separate one of the enterprise customers; sending, from the edge router to an asset-hosting server, the plurality of data streams via a packet data gateway; receiving, at the edge router from the asset-hosting server and packet data gateway, a plurality of return data streams including the requested enterprise assets via the data gateway, each return data stream maintained separately and associated with a separate one of the enterprise customers; and/or sending, from the edge router to the plurality of UEs, a plurality of responses.

In various embodiments, additional, fewer, or alternate actions may be included or performed by the systems, devices, methods, and computer-readable media, including those discussed elsewhere herein.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the Figures is intended to accord with one or more possible embodiments thereof. Furthermore, wherever possible, the following description refers to the reference numerals included in the following Figures, in which features depicted in multiple Figures are designated with consistent reference numerals.

DETAILED DESCRIPTION

As described herein, distinction between enterprise customers sharing the same wireless network provider may be accomplished by the techniques disclosed herein. Such techniques may include the use of Virtual Local Area Networks (VLANS), Virtual Routing and Forwarding (VRF), and separate virtual environments running on a physical or a cloud based asset-hosting server. The VRF may be implemented either as VRF-lite, or a VRF used in conjunction with Multiprotocol Label Switching (MPLS). In addition to the VRF, separate virtual environments at the asset-hosting server for each enterprise provide for different levels of services to each enterprise, while maintaining the economy of shared infrastructure network hardware.

Additionally, the wireless network provider or the enterprise customers may make use of a cloud-based infrastructure for asset management. This can be a public cloud (such as Amazon Web Servicee), a private cloud with virtual resources hosted on the hardware of the enterprise customer or the wireless network provider, or a combination hybrid cloud infrastructure. This may be enabled at an asset-hosting server, with the cloud portion dynamically sized depending on the traffic expected or the service that needs to be performed. The cloud infrastructure, besides the elastic resource capacity, can offer virtualized resources, automated management, and (in the case of a public third-party cloud) pay-as-you-go pricing to address surges in demand.

Figure 1:
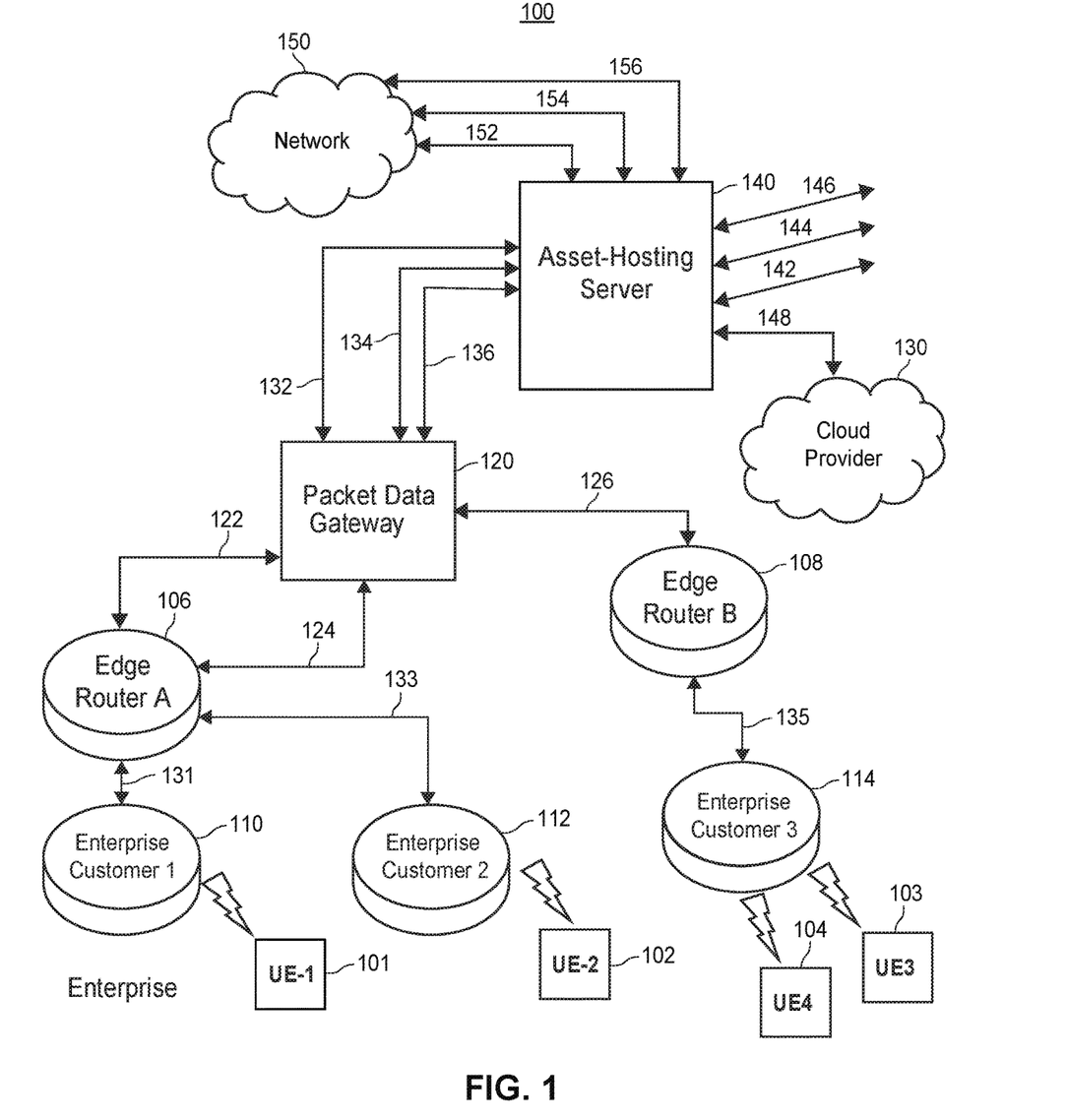
FIG. 1 illustrates a block diagram of an exemplary mobile communication network including an asset-hosting server.

FIG. 1 illustrates a block diagram of an exemplary mobile communication network 100 to support multiple enterprises, each enterprise having a set of one or more assets such as User Equipment (UE) devices 101, 102, 103, 104. The exemplary mobile communication network 100 has been simplified for clarity. Each UE device 101-104 may be a mobile telephone or computing device, such as a smartphone, a network-enabled tablet computer, or similar mobile device capable of receiving and processing electronic information through a wireless communication network. Each UE device 101-104 includes a controller that stores and processes electronic data and a communication unit that connects with the wireless communication network. In addition, each UE device 101-104 may further include input and output components, internal sensors, or other components to enhance the functionality of the UE device that are not shown in FIG. 1. Data from the UE devices are often routed through an enterprise customer router 110, 112, 114 while the UEs are located on the enterprise customer premises. The enterprise customer router 110, 112, 114, in turn routes data from the enterprise's UE devices in a data stream to service provider edge routers 106, 108. Alternately, while off the enterprise customer premises, or if the enterprise does not have its own enterprise customer router 110, any of the UE devices 101-104 may route its data stream to either of the edge routers 106, 108, without an enterprise customer router 110. In either case, the service provider edge routers 106, 108 keep the data streams separated between enterprises (i.e., separating data streams from enterprise customer routers or from UE devices associated with different enterprise customers). The connectivity paths 131, 133, 135 between enterprise customer routers 110, 112, 114 and service provider edge routers 106, 108 may be provided by an Ethernet service, a point-to-point circuit or via Border Gateway Protocol (BGP) routing, which allows scaling on the service provider edge routers 106, 108 to support multiple enterprise customer locations. Data of each enterprise customer is segregated to its own VRF instance on the service provider edge routers 106, 108. The edge routers 106, 108 are in turn connected to the packet data gateway 120, typically using separate VLANs 122, 124, 126 for the separate enterprise traffic streams, which preserves the separation of the data streams without comingling with data streams of other enterprises.

The packet data gateway 120 is configured with access point names (APNs) where each of the APNs is assigned to an associated enterprise customer account. The enterprise accounts are associated with a plurality of UE devices or other mobile assets. Data associated with each of the enterprises (and their APNs) is separated from communication data associated with other enterprises (and other APNs), with the separate data streams forwarded from the packet data gateway 120 to an asset-hosting server 140 on a per VLAN basis. In some embodiments, the asset server 140 may likewise maintain separate data streams to external networks 150, such as the internet.

The asset-hosting server 140 maintains multiple virtual environments, and in some embodiments uses inbound VLANs 132, 134, 136, and outbound VLANs 152, 154, 156 to separate the traffic from multiple enterprises. The asset-hosting server 140 additionally offers separate logon portals 142, 144, 146 associated with the virtual environments in order to enable enterprise management for their own UEs. The virtual environments may be generated and managed by a hypervisor or other suitable software applications running on the asset-hosting server 140. In one embodiment, the asset-hosting server 140 includes a native "bare metal" hypervisor running directly on the asset-hosting server hardware, such as VMWare ESXi® or Microsoft Hyper-V® to manage the virtual environments. In another embodiment the multiple enterprises are supported by a hosted hypervisor running as a process on top of a host operating system (e.g., Red Hat® Virtualization) that can also support the multiple environments.

Multiple virtual environments are used at the asset-hosting server 140 in order to support multiple enterprise customers, their independent data streams, and the differing rules of the enterprises. These rules may, for example, include initial provisioning or configuration of the UEs, such as provisioning via the wireless carrier's Over the Air Activation server, ongoing updates of the enterprise's UEs from a third-party server, remote retrieval of information from the UE devices, or processing of events and alarms generated by UEs. Services managed by the asset-hosting server 140 may include initial provisioning or ongoing updates from an Over-the-Air provisioning server or other server of the telecommunications carrier or provisioning or updates from a preapproved server of a particular enterprise. Updates may include, for example, updates to UE parameters such as the Public Land Mobile Network (PLMN) priority list on the UE Subscriber Identity Module (SIM) or similar telecommunications SIM identity card or to an embedded identity. Updates to UE applications from an enterprise server or an application download or update from a third-party application store may also be needed by enterprises. The enterprises may also want to regulate access of their UEs to third-party services (such as, for example prohibiting downloads of applications that do or do not originate from the developers of the UE operating systems). The enterprises may also wish to enforce various rules for enterprise security services, which may include mandatory password use and password expiration, password length and complexity requirements, the ability to remotely lock or wipe a device, the use of tools to encrypt data, or prohibiting or regulating the use of removable media. The enterprises may further desire to disable Wi-Fi access, disable or otherwise regulate cameras associated with the UE devices, or disable infrared ports. The enterprises may enforce enterprise policies on access to peripherals, such as regulating wireless headphones, speakers or other accessories. The above rules and options are will vary from enterprise to enterprise.

VLAN connectivity is used in one embodiment. However, separate independent Local Area Networks (LANs) running on separate physical cabling into or out of the asset-hosting server 140 and packet data gateway 120 may also be supported in a different embodiment, especially as may be required by more stringent security requirements of an enterprise such as requirements from a government or military entity.

In some embodiments, each virtual environment will support its own separate access to external networks 150, such as to the internet or to a private LAN. Each environment may additionally support its own separate cloud resources in order to support separate provisioning, separate billing, separate usage monitoring, separate internet use policies, content filtering, and other rules which may vary from enterprise to enterprise. Each enterprise customer is assigned their own virtual instance, where firewall, load balancers, or other IT infrastructure can be spun up virtually. This can be done directly on the asset-hosting server 140 or at server equipment of a cloud provider 130 or a combination of both. Thus, the asset-hosting server 140 may be configured to provide secure connections 148 from the virtual environments to one or more cloud providers 130. Some services, for example Dynamic Host Configuration Protocol (DHCP), may be located on a physical asset-hosting server 140 on telecommunications carrier premises for the purposes of assigning dynamic Internet Protocol (IP) addresses. Other services, such as provisioning, billing services or internet content filtering, may be performed at processing equipment of a cloud provider 130. If a cloud provider 130 is used, the VLANs may be encapsulated by the asset-hosting server 140 using a VRF prior to being transported to the cloud provider 130 in order to maintain a separation of the data from the various enterprise customers. Once the cloud provider 130 has performed the service, the response or the transformed data is sent back to the UE. For example, once the cloud provider 130 provides the needed service to the enterprises data for enterprise customer, the cloud provider 130 sends the response to the asset-hosting server 140. The asset-hosting server 140 receives the response and the response is sent to the packet data gateway 120, then to the appropriate service provider edge router (e.g., edge router A 106) to provide the response to the appropriate EU device 101-104 (e.g., to the UE 101).

Figure 2:
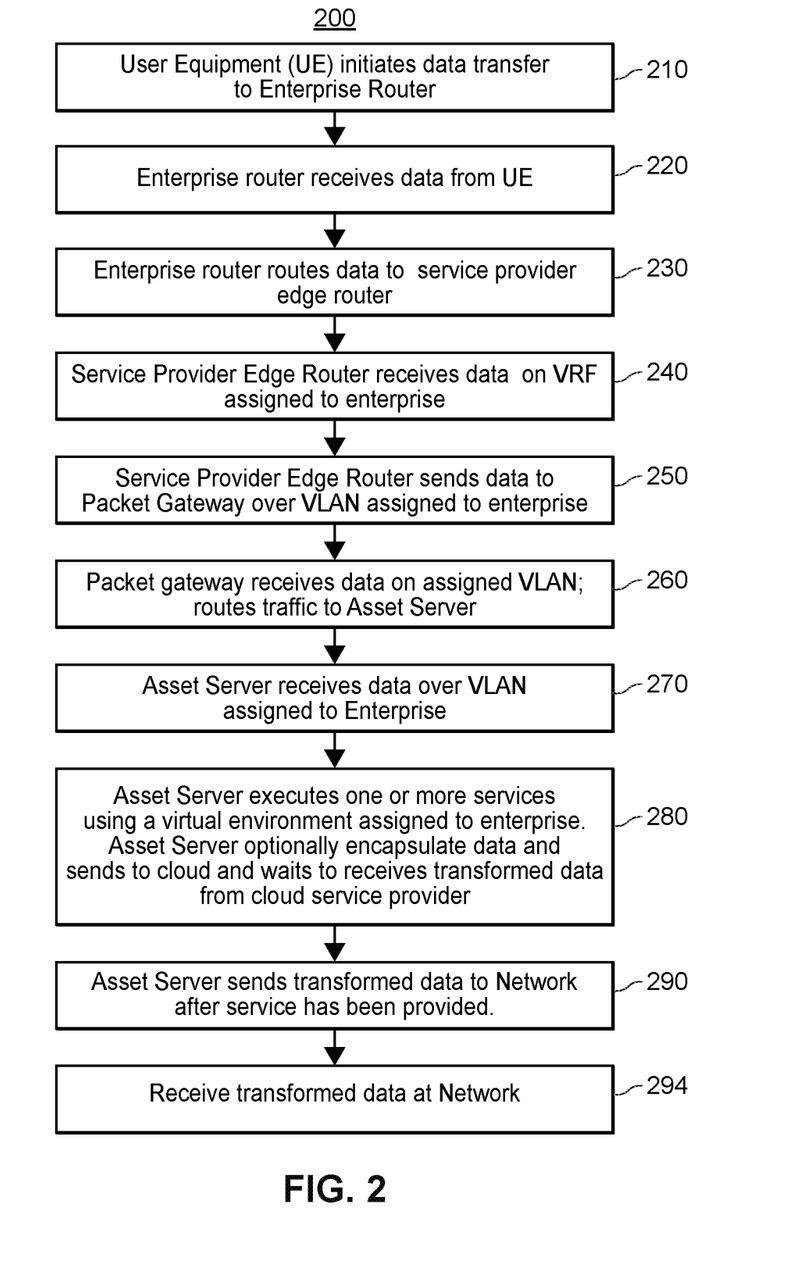
FIG. 2 illustrates a flow chart of an exemplary asset control method, showing data being transported from the UE to a network such as the internet.

FIG. 2 illustrates a flow chart of an exemplary asset control method 200, showing data being transported between an enterprise UE (e.g., one of the UE devices 101-104) and a network (e.g., a cloud provider 130, an asset-hosting server 140, or an external network 150). The network may be a private LAN controlled by the enterprise or may be the public internet. In this example, a data upload is initiated at an enterprise UE (block 210). The data is received by a customer's enterprise router (block 220), which may exist on the customer premises or at another networked location. The data is then routed via a connectivity path 131, such as a Virtual Private Network (VPN) or other secure means, between the enterprise customer router 110 and the service provider edge router 106 (block 230). To reduce circuit costs and delays, the service provider edge router 106 is ideally located geographically close to the enterprise router 110.

The service provider edge router 106 may make use of a virtual routing and forwarding (VRF) to ensure separate paths for data streams originating at each enterprise (block 240). The data is then routed from the service provider edge router 106 to the packet data gateway 120 using a Virtual LAN (VLAN) 122 (block 250), which isolates the data associated with the different enterprises such that the data for each enterprise is transported on a separate VLAN (e.g., VLAN 124). The data is then routed from the packet data gateway 120 to the asset-hosting server 140 (block 260), again using a VLAN 132 dedicated to the particular enterprise, with VLANs 134 and 136 being dedicated to other enterprise customers. This can be done, for example, over a Gi interface, the interface traditionally used between packet data gateways and Gateway GPRS (Global Packet-Radio Service) Support Nodes (GGSN) in a mobile network. Thus, the connectivity provided by the VLANs 132, 134, 136 from the packet data gateway 120 to the asset-hosting server 140 occurs on a per VLAN basis in order to maintain the separation between the data streams associated with the enterprise customers.

The asset-hosting server 140 receives the data from the packet data gateway 120 and routes the data according to the instructions in the VRF table, which provides separate routing for this enterprises instance on the asset-hosting server (block 270). Accordingly, the data may or may not be routed to a cloud provider 130 for services required by the particular enterprise. In some embodiments, the data communicated with the cloud provider 130 is encapsulated by the enterprise's assigned VRF on the asset server 140, then received by the enterprise's instance on the cloud, where the data is transformed, such as by performing a security service, internet content filtering or the like, and then the transformed data is returned to the asset-hosting server 140 (block 280).

The response data may then be routed by the asset-hosting server 140 to an external network 150 (e.g., the internet) or to a local network as specified by the VRF for the associated enterprise (block 290). Thus, the data may be received by the appropriate network (block 294). This innovation also includes a similar method and call flow, through the same devices, but in the opposite direction (e.g., from the external network 150 to a UE device 110, passing through asset-hosting server 140, packet data gateway 120, service provider edge router 106, and enterprise customer router 110).

Figure 3:
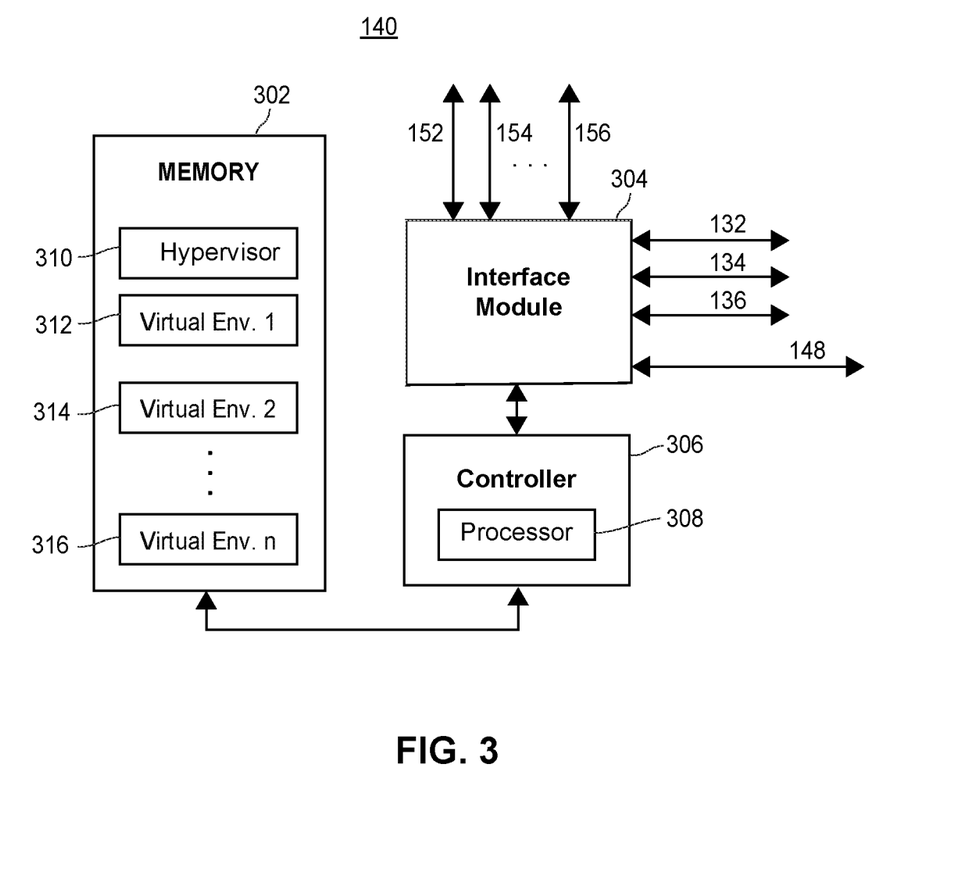
FIG. 3 illustrates a block diagram of the asset-hosting server of the exemplary mobile communication network.

FIG. 3 illustrates a block diagram of the asset-hosting server 140 shown in FIG. 1. The server contains a program memory 302, as well as a controller 306 and an interface module 304. The memory 302 stores executable instructions that, when executed by the controller 306, produce a hypervisor 310 and multiple virtual environments 312, 314, 316 corresponding to the multiple enterprise customers or enterprise customer accounts. The controller 306 includes a processor 308 and may contain its own controller memory (not shown), and controller 306 may optionally use a cloud environment of a cloud provider 130. Using a cloud environment offers advantages such as dynamically expanding to support larger capacity needs, and thus the ability to support more or larger enterprises. Separate logon portals 142, 144, 146 are provided into the asset-hosting server 140 to be used for the management of assets associated with separate enterprises. In some embodiments, each virtual environment 312, 314, 316 assigned to an enterprise supports separate network access, such as by separate VLANs (or, in some cases, via separate physical cabling to the network) via the interface module 304. Each virtual environment 312, 314, 216 may additionally or alternatively access separate cloud resources (via one or more secure connections 148) in order to support separate provisioning, separate billing, separate usage monitoring, separate internet use and content filtering policies and other rules, which may vary from enterprise to enterprise. For example, each customer may have its own virtual instance where firewall, load balancers, internet content filtering solutions, or other IT infrastructure can be spun up virtually. This can be done entirely on the asset-hosting server 140 or in whole or in part at a server or server group of a cloud provider 130 accessed through the asset-hosting server 140. Communication from asset-hosting server 140 to the cloud 130 may be supported with VLANs to encapsulate and encrypt data prior to the data being transported between the asset hosting server 140 and the cloud 130.

Figure 4:
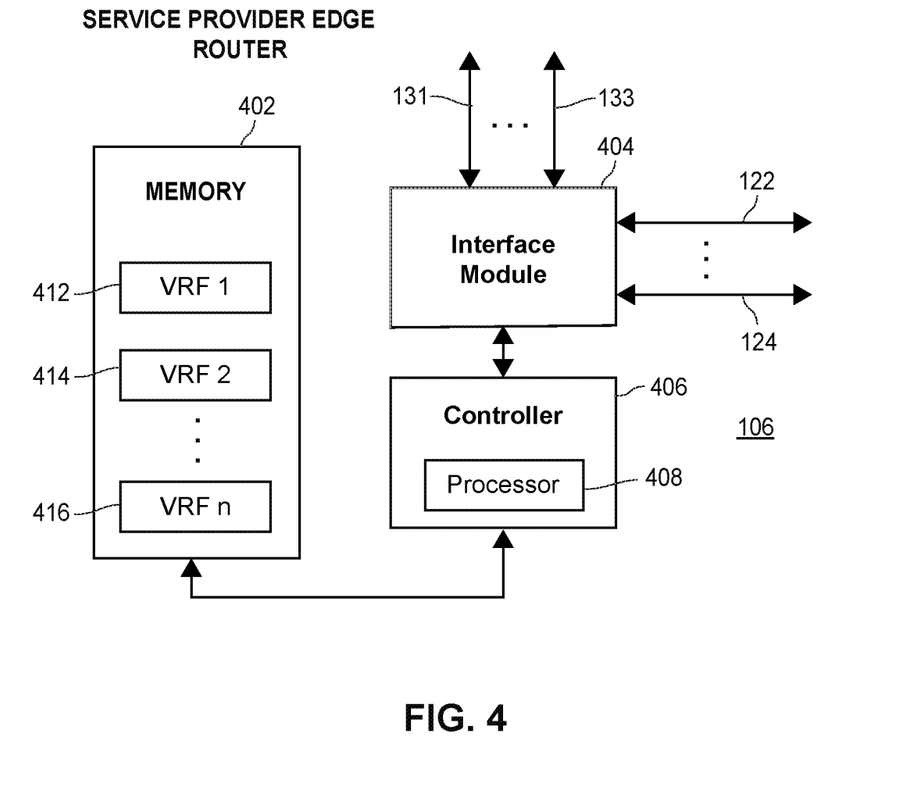
FIG. 4 illustrates a block diagram of the network edge router of the exemplary mobile communication network.

FIG. 4. Illustrates a block diagram of the service provider edge router 106. The service provider edge router 106 contains a program memory 402, as well as a controller 406 and an interface module 404. The memory 402 stores computer-readable instructions comprising a plurality of Virtual Routing and Forwarding (VRF) entries 412, 414, 416 associated with data of the plurality of enterprise customers. Thus, in order to maintain a logical separation of the data streams of the enterprise customers or accounts, the edge router 106 implements one VRF entry 412, 414, 416 for each enterprise being supported. The controller 406 contains a processor 408 and may include a controller memory (not shown). The interface module 404 manages the connectivity between the enterprise customer routers 110, 112 and the packet data gateway 120 according to the rules set out in the VRF entries 412, 414, 416. The VRFs in the router thus allow instances of a routing table to co-exist within the same service provider edge router 106.

As an example of the operation of the service provider edge router 106, the edge router 106 may receive requests to access enterprise assets, including from the UE devices 101 and 102 associated with enterprises customers 1 and 2. These UE devices may or may not be configured to make use of an enterprise customer routers 110 and 112. Each enterprise customer is assigned a separate data stream, which is forwarded by service provider edge router 106 to packet data gateway 120 and then to asset-hosting server 140, while each of the data streams remains logically separate. The service provider edge router 106 may also receive return data streams from asset-hosting server 140 via the packet data gateway 120. The service provider edge router 106 maintains the streams separately, and it associates the separate data streams with separate enterprise customers based upon the VRF entries 412, 414, 416 stored in its program memory 402. The service provider edge router 106 relays the return data streams back to the separate enterprise's UE devices 101 or 102, optionally using the separate enterprise customer routers 110 or 112. The return data streams contain the responses to the requested enterprise service. The service provider edge gateway 108 may operate in a similar manner.

Although individual operations of one or more methods are illustrated and described as separate operations, one or more of the individual operations may be performed concurrently, and nothing requires that the operations be performed in the order illustrated. Structures and components functionality presented as separate components in example configurations may be implemented as a combined structure or component. Similarly, structures and components functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

What is claimed:

1. A system for control of mobile assets, comprising:
   one or more edge routers comprising one or more processors configured to provide access to enterprise assets via a communication network to a plurality of user equipment (UE) devices associated with a plurality of enterprise customers;
   one or more packet data gateways communicatively connected to one or more edge routers and comprising one or more network interface components configured to send and receive data via the communication network; and one or more asset-hosting servers communicatively connected to the one or more packet data gateways and comprising one or more processors configured to implement a plurality of virtual environments associated with the plurality of enterprise customers, wherein the one or more edge routers are configured to separate communication data associated with requests to access the enterprise assets from the plurality of UE devices into a plurality of data streams, each data stream being maintained separately and associated with a separate one of the plurality of enterprise customers via with a corresponding one of the plurality of virtual environments associated with the enterprise customer.

2. The system of claim 1, wherein the one or more packet data gateways are configured with a plurality of access point names (APNs), wherein each of the APNs is assigned to an enterprise customer account associated with a subset of the plurality of UE devices, and wherein communication data associated with each of the APNs is separated from communication data associated with other APNs.

3. The system of claim 1, wherein the asset-hosting servers are part of a cloud storage network.

4. The system of claim 1, wherein the asset-hosting servers are configured to perform virtual routing and forwarding to separate communication data.

5. The system of claim 1, wherein the asset-hosting servers are configured to provide content filtering for one or more of the virtual environments.

6. The system of claim 1, wherein the asset-hosting servers are configured to provide security services for one or more of the virtual environments, the security services including managing one or more of: password policies, data wiping, data encryption, UE use of removable media, UE connectivity to peripheral devices, or UE use of an associated camera.

7. The system of claim 1, wherein the asset-hosting servers are configured to provide Dynamic Host Configuration Protocol (DHCP) services to assign internet protocol (IP) addresses for one or more of the virtual environments.

8. The system of claim 1, wherein the asset-hosting servers are configured to regulate UE access to application stores or to third-party application downloads.

9. The system of claim 1, wherein the asset-hosting servers are configured to perform initial provisioning of UE devices corresponding to one of the virtual environments.

10. The system of claim 1, wherein the asset-hosting servers are configured to perform updates of applications or configuration of UE devices corresponding to one of the virtual environments.

11. A method for control of mobile assets, comprising:
receiving, at an edge router, a plurality of requests to access enterprise assets associated with a plurality of enterprise customers from a plurality of user equipment (UE) devices;
separating, by the edge router, the plurality of requests into a plurality of data streams, each data stream maintained separately and associated with a separate one of the enterprise customers;
sending, from the edge router to an asset-hosting server, the plurality of data streams via a packet data gateway;
receiving, at the edge router from the asset-hosting server and packet data gateway, a plurality of return data streams including the requested enterprise assets via the packet data gateway, each return data stream maintained separately and associated with a separate one of the enterprise customers; and
sending, from the edge router to the plurality of UEs, a plurality of responses.

12. The method of claim 11, wherein the packet data gateway is configured with a plurality of access point names (APNs), wherein each APN is assigned to an enterprise.

13. The method of claim 11, wherein the asset-hosting servers are configured to provide content filtering for one or more of virtual environments and wherein the requested enterprise assets included in the plurality of return data streams comprise filtered response data.

14. The method of claim 11, wherein the asset-hosting servers are configured to provide security services for one or more of virtual environments and wherein the requested enterprise assets included in the plurality of return data streams comprise secured response data.

15. The method of claim 11, wherein the edge router is communicatively connected to the packet data gateway by a plurality of virtual local area network (VLAN) connections corresponding to the plurality of data streams.

16. An edge router, comprising:
one or more processors;
a network interface; and
a memory operatively connected to the one or more processors and storing executable instructions that, when executed by the one or more processors, cause the edge router to:
receive, via the network interface, a plurality of requests to access enterprise assets associated with a plurality of enterprise customers from a plurality of user equipment (UE) devices;
separate the plurality of requests into a plurality of data streams, each data stream maintained separately and associated with a separate one of the enterprise customers;
send, via the network interface, the plurality of data streams to an asset-hosting server via a packet data gateway;
receive, via the network interface, a plurality of return data streams including the requested enterprise assets from the asset-hosting server via the packet data gateway, each return data stream maintained separately and associated with a separate one of the enterprise customers; and
send, via the network interface, a plurality of responses to the plurality of UEs.

17. The edge router of claim 13, wherein the packet data gateway is configured with a plurality of access point names (APNs), wherein each APN is assigned to an enterprise, and wherein the executable instructions that cause the edge router to send the plurality of data streams to the asset-hosting server via the packet data gateway cause the edge router to send each of the plurality of data streams to a separate corresponding APN of the plurality of APNs.

18. The edge router of claim 13, wherein the executable instructions further cause the edge router to establish a plurality of virtual local area network (VLAN) connections with the packet data gateway, wherein each of the plurality of VLAN connections corresponds to one of the plurality of data streams.

* * * * *

UNITED STATES PATENT AND TRADEMARK OFFICE
CERTIFICATE OF CORRECTION

PATENT NO. : 11,540,131 B2
APPLICATION NO. : 16/867752
DATED : December 27, 2022
INVENTOR(S) : Paul Farag Page 1 of 1

It is certified that error appears in the above-identified patent and that said Letters Patent is hereby corrected as shown below:

In the Claims

At Column 10, Line 49, Claim 17, "claim 13," should be -- claim 16, --.

At Column 10, Line 57, Claim 18, "claim 13," should be -- claim 16, --.

Signed and Sealed this
Twenty-sixth Day of September, 2023

Katherine Kelly Vidal
*Director of the United States Patent and Trademark Office*